United States Patent
Hayasaka et al.

(10) Patent No.: US 9,057,026 B2
(45) Date of Patent: Jun. 16, 2015

(54) METHOD FOR PRODUCING LUBRICANT BASE OIL

(75) Inventors: Kazuaki Hayasaka, Tokyo (JP); Hideki Ono, Tokyo (JP); Yoshiyuki Nagayasu, Tokyo (JP); Masahiro Taguchi, Tokyo (JP); Hideshi Iki, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 787 days.

(21) Appl. No.: 13/391,067

(22) PCT Filed: Aug. 6, 2010

(86) PCT No.: PCT/JP2010/063357
§ 371 (c)(1), (2), (4) Date: May 8, 2012

(87) PCT Pub. No.: WO2011/021513
PCT Pub. Date: Feb. 24, 2011

(65) Prior Publication Data
US 2012/0217186 A1    Aug. 30, 2012

(30) Foreign Application Priority Data
Aug. 18, 2009  (JP) .............................. P2009-189432

(51) Int. Cl.
| | | |
|---|---|---|
| C10G 73/38 | (2006.01) | |
| C10G 65/02 | (2006.01) | |
| B01J 21/06 | (2006.01) | |
| B01J 23/85 | (2006.01) | |
| B01J 23/882 | (2006.01) | |
| B01J 23/883 | (2006.01) | |
| B01J 23/888 | (2006.01) | |
| B01J 35/00 | (2006.01) | |
| B01J 35/10 | (2006.01) | |
| B01J 37/00 | (2006.01) | |
| B01J 37/03 | (2006.01) | |
| C10G 45/58 | (2006.01) | |
| C10G 45/60 | (2006.01) | |
| C10G 45/62 | (2006.01) | |
| C10G 45/64 | (2006.01) | |
| C10G 65/04 | (2006.01) | |
| C10G 73/00 | (2006.01) | |
| C10M 101/02 | (2006.01) | |
| B01J 29/74 | (2006.01) | |

(52) U.S. Cl.
CPC .............. *C10G 65/02* (2013.01); *B01J 21/066* (2013.01); *B01J 23/85* (2013.01); *B01J 23/882* (2013.01); *B01J 23/883* (2013.01); *B01J 23/888* (2013.01); *B01J 29/7484* (2013.01); *B01J 35/002* (2013.01); *B01J 35/1061* (2013.01); *B01J 35/108* (2013.01); *B01J 37/0009* (2013.01); *B01J 37/03* (2013.01); *C10G 45/58* (2013.01); *C10G 45/60* (2013.01); *C10G 45/62* (2013.01); *C10G 45/64* (2013.01); *C10G 65/043* (2013.01); *C10M 101/02* (2013.01); *C10M 2203/1025* (2013.01); *C10M 2205/173* (2013.01); *C10N 2220/026* (2013.01); *C10N 2220/027* (2013.01); *C10N 2220/028* (2013.01); *C10N 2220/031* (2013.01); *C10N 2230/02* (2013.01); *C10N 2230/10* (2013.01); *C10N 2230/43* (2013.01); *C10N 2240/10* (2013.01); *C10N 2270/00* (2013.01); *C10G 2300/1022* (2013.01); *C10G 2300/107* (2013.01); *C10G 2300/1074* (2013.01); *C10G 2300/1077* (2013.01); *C10G 2300/202* (2013.01); *C10G 2300/301* (2013.01); *C10G 2300/302* (2013.01); *C10G 2300/304* (2013.01); *C10G 2400/10* (2013.01)

(58) Field of Classification Search
CPC .................. C10G 73/00; C10G 73/38; C10G 2300/1062; C10G 2400/10; C10M 101/02
See application file for complete search history.

(56) References Cited

U.S. PATENT DOCUMENTS

| | | | |
|---|---|---|---|
| 5,282,958 | A | 2/1994 | Santilli et al. |
| 6,051,127 | A | 4/2000 | Moureaux |
| 6,706,659 | B2 | 3/2004 | Gillespie et al. |
| 8,372,263 | B2 | 2/2013 | Hayasaka |

(Continued)

FOREIGN PATENT DOCUMENTS

| | | |
|---|---|---|
| CN | 1222182 | 7/1999 |
| EA | 001619 | 6/2001 |

(Continued)

OTHER PUBLICATIONS

Office Action for TW Patent Application No. 099127331 dated Jul. 25, 2014.

(Continued)

*Primary Examiner* — Brian McCaig
(74) *Attorney, Agent, or Firm* — Greenblum & Bernstein, P.L.C.

(57) ABSTRACT

A method for producing a lubricant base oil includes contacting feedstock containing normal paraffins having not less than 20 carbon atoms with a first catalyst in the presence of molecular hydrogen to obtain a first produced oil, and contacting the first produced oil with a second catalyst in the presence of molecular hydrogen to obtain a second produced oil. The first catalyst includes a first carrier in which a fraction of an amount of $NH_3$ to be desorbed at 300 to 800° C. based on a total amount of $NH_3$ to be desorbed is 80 to 90% in temperature-programmed desorption of $NH_3$, a first metal selected from metals of Group VI in the periodic table carried on the first carrier, and a second metal selected from metals of Group VIII to Group X in the periodic table carried on the first carrier.

15 Claims, No Drawings

(56) References Cited

U.S. PATENT DOCUMENTS

| | | |
|---|---|---|
| 2003/0050523 A1 | 3/2003 | Gillespie et al. |
| 2004/0108245 A1 | 6/2004 | Jiang et al. |
| 2004/0259726 A1 | 12/2004 | Gillespie et al. |
| 2010/0181229 A1 | 7/2010 | Hayasaka |

FOREIGN PATENT DOCUMENTS

| | | |
|---|---|---|
| JP | 2006-188634 | 7/2006 |
| RU | 2 294 797 | 3/2007 |
| TW | 589367 | 6/2004 |
| TW | 200900145 | 1/2009 |
| WO | 98/02503 | 1/1998 |

OTHER PUBLICATIONS

Karge et al., "Investigation of the Distribution of Acidity in Zeolites by Temperature-Programmed Desorption of Probe Molecutles. 1. Dealuminated Mordenites", J. Phys. Chem., 1990, pp. 765-773.

Sawa et al., "Relationship between acid amount and framework aluminum content in mordenite", Zeolites, Jul./Aug. 1990, pp. 532-538.

Search report from International Application No. PCT/JP2010/0633757, mail date is Aug. 31, 2010.

Search report from International Preliminary Report on Patentability for International Application No. PCT/JP2010/0633757, mail date is Mar. 22, 2012.

Notice of Allowance from Russian Patent Application No. 2012110229, which was mailed on May 12, 2014.

Chinese Office Action in respect to Chinese Appl. No. 201080036679.X, dated Aug. 26, 2013.

METHOD FOR PRODUCING LUBRICANT BASE OIL

TECHNICAL FIELD

The present invention relates to a method for producing a lubricant base oil.

BACKGROUND ART

Among petroleum products, jet fuels, diesel oils, lubricant oils, and the like are the products whose fluidity at a low temperature is important. For this reason, desirably, in a base oil used for these products, wax components such as normal paraffins that cause the fluidity at a low temperature to be reduced are completely or partially removed, or converted to a component other than the wax components. Moreover, recently, hydrocarbon oils obtained by a Fischer-Tropsch synthesis (hereinafter, written as the "FT synthesis" in some cases) have received attention as a feedstock for producing fuel oils and lubricant oils because the content of substances of concern such as sulfur is small; however, a large amount of the wax components are contained also in the hydrocarbon oils.

As a dewaxing technique for removing a wax component from a hydrocarbon oil, a method of extracting a wax component by a solvent such as liquefied propane and methyl ethyl ketone is known. However, in the method, there are problems such as increase in the scale of the apparatus, expensive operating cost, limitation of the kind of an applicable feedstock, and limitation of the yield of the product by the kind of the feedstock.

On the other hand, as a dewaxing technique for converting a wax component in a hydrocarbon oil into a non-wax component, a contact dewaxing technique is known in which a hydrocarbon oil is contacted with a hydrogenation isomerization dewaxing catalyst having both a hydrogenation-dehydrogenation ability and an isomerization ability in the presence of molecular hydrogen to isomerize normal paraffins in the hydrocarbon oil to isoparaffins, for example.

The contact dewaxing is effective as a method for improving the fluidity at a low temperature of the hydrocarbon oil, but a conversion rate of the normal paraffins needs to be sufficiently high in order to obtain a fraction suitable for a base oil for a lubricant oil. However, a hydrogenation isomerization catalyst used in the contact dewaxing has both an isomerization ability and an ability to crack hydrocarbons; for this reason, cracking of the hydrocarbon oil and production of lighter products progress as the conversion rate of the normal paraffins is increased, and it is difficult to obtain a desired fraction with high efficiency. Particularly, in production of a high quality base oil for a lubricant oil of which a high viscosity index and a low pour point are demanded, it is very difficult to obtain a target fraction economically; for this reason, synthetic base oils such as poly-alpha-olefins have been used often in the field.

From such a circumstance, in the field of production of the lubricant base oil, a dewaxing technique for efficiently obtaining a desired isoparaffin fraction from a hydrocarbon oil containing a wax component has been demanded.

So far, an attempt to improve the isomerization selectivity of the hydrogenation isomerization catalyst used in the contact dewaxing has been made. For example, Patent Literature 1 below discloses a process in which a linear or slightly branched hydrocarbon raw material having not less than 10 carbon atoms is contacted under an isomerization condition with a catalyst comprising a molecular sieve such as ZSM-22, ZSM-23, ZSM-48 containing a metal of Group VIII to Group X in the periodic table and having one-dimensional pores of a middle size in which the size of a crystallite does not exceed approximately 0.5μ, thereby to produce a dewaxed lubricant oil (Patent Literature 1).

CITATION LIST

Patent Literature

Patent Literature 1: U.S. Pat. No. 5,282,958

SUMMARY OF INVENTION

Technical Problem

However, even in the process for producing a lubricant base oil described in Patent Literature 1, it cannot be said that the isomerization selectivity of the catalyst is sufficient, and it is difficult to obtain an isoparaffin fraction suitable for a desired lubricant base oil from a hydrocarbon oil containing a normal paraffin component with a high yield. Particularly, in production of a high quality lubricant base oil, the conversion rate of the lubricant base oil needs to be increased to the extent that normal paraffins are substantially not contained; in this case, a cracking reaction of normal paraffins and/or isoparaffins that are isomerized product is active, and it is difficult to obtain a target lubricant base oil with an economical yield.

The present invention has been made in consideration of the problems above, and an object of the present invention is to provide a method for producing a lubricant base oil in which a high quality lubricant base oil can be stably obtained from a feedstock containing normal paraffins with a high yield.

Solution to Problem

Namely, the present invention provides a method for producing a lubricant base oil, comprising: a first step of contacting a feedstock containing normal paraffins having not less than 20 carbon atoms with a first catalyst in the presence of molecular hydrogen to obtain a first produced oil, and a second step of contacting the first produced oil with a second catalyst in the presence of molecular hydrogen to obtain a second produced oil, wherein the first catalyst comprises a first carrier in which a fraction of an amount of $NH_3$ to be desorbed at 300 to 800° C. based on a total amount of $NH_3$ to be desorbed is 80 to 90% in temperature-programmed desorption of $NH_3$ ($NH_3$-TPD), a first metal that is at least one selected from metals that belong to Group VI in the periodic table and is carried on the first carrier, and a second metal that is at least one selected from metals that belong to Group VIII to Group X in the periodic table and is carried on the first carrier; a sum $C_1+C_2$ of a proportion $C_1$ of the first metal contained in the first catalyst in terms of an oxide (% by mass) and a proportion $C_2$ of the second metal contained in the first catalyst in terms of an oxide (% by mass) is 22 to 36% by mass; and a ratio $D_1/D_2$ between a content of the second metal $D_2$ (mol) and a content of the first metal $D_1$ (mol) in the first catalyst is 1.07 to 7.78.

According to the method for producing a lubricant base oil according to the present invention, a high quality lubricant base oil can be stably obtained from a feedstock containing normal paraffins having not less than 20 carbon atoms with a high yield. More specifically, a problem of the conventional method for producing a lubricant base oil is that if the conversion rate of the normal paraffins is sufficiently increased, the yield is undesirably reduced by a hydrocracking reaction of the normal paraffins that occurs at the same time. Moreover, if the hydrocracking reaction is suppressed, the conversion rate of the normal paraffins is reduced. When the conversion rate of the normal paraffins is reduced, a need to remove excessive normal paraffins is produced in the subsequent dewaxing step, resulting in reduction in the yield. Contrary to this, according to the method for producing a lubricant base oil according to the present invention, in the feedstock containing normal paraffins having not less than 20 carbon atoms, while the hydrocracking reaction can be suppressed, hydrodesulfurization, hydrogenation denitrification, and hydrogenation isomerization can be efficiently progressed. In the thus-obtained produced oil, the total content of the respective paraffins having not less than 20 carbon atoms is approximately the same as that in the feedstock, the contents of sulfur and nitrogen are sufficiently reduced, and most of the normal paraffins having not less than 20 carbon atoms are converted to isomerized paraffins having not less than 20 carbon atoms.

In the method for producing a lubricant base oil according to the present invention, preferably, the first step is performed so that in the first produced oil, the proportion of light paraffins having less than 20 carbon atoms to be contained is 0 to 10% by mass, the proportion of isomerized paraffins having not less than 20 carbon atoms to be contained is not less than 70% by mass, the proportion of sulfur to be contained is not more than 10 mass ppm, and the proportion of nitrogen to be contained is not more than 3 mass ppm. According to such a production method, the effect above is more remarkably obtained.

Preferably, the first catalyst contains molybdenum and/or tungsten as the first metal, and cobalt and/or nickel as the second metal. According to such a catalyst, the hydrocracking reaction accompanying hydrogenation isomerization can be further suppressed.

Moreover, preferably, the first catalyst further contains phosphorus carried on the first carrier, and the proportion of the phosphorus in the first catalyst in terms of an oxide is 0.1 to 8% by mass. Such a catalyst is likely to further improve the activity of the catalyst.

Moreover, preferably, in the first catalyst, the average pore radius is 40 to 200 Å, the total volume of pores whose pore radius is less than 40 Å is 0.1 to 5% of the total pore volume, and the total volume of pores whose pore radius is more than 200 Å is 0.1 to 5% of the total pore volume. According to such a catalyst, hydrodesulfurization, hydrogenation denitrification, and hydrogenation isomerization can be progressed more efficiently.

Preferably, the first carrier is a carrier containing a complex oxide of alumina, silica, and zirconia. If the first catalyst contains such a carrier, the first catalyst can further suppress the hydrocracking reaction accompanying hydrogenation isomerization, and securely has mechanical strength durable in commercial use.

In the first step, part or all of the normal paraffins having not less than 20 carbon atoms is isomerized to isoparaffins.

Preferably, the feedstock is at least one selected from the group consisting of slack waxes, dewaxed oils, paraffin waxes, microcrystalline waxes, petrolatum, Fischer-Tropsch waxes, light vacuum gas oils, hydrocracked vacuum gas oils, hydrocracked atmospheric residue, and hydrocracked vacuum residue. Such a feedstock is available economically and stably.

In the method for producing a lubricant base oil according to the present invention, preferably, the first step is performed so that the conversion rate of the normal paraffins represented by the following formula (3) is not less than 70%. According to the first produced oil obtained at such a conversion rate, a high quality lubricant base oil can be obtained with a higher yield.

Conversion rate of the normal paraffins (%)=[1−(total mass of the normal paraffins having not less than 20 carbon atoms in the first produced oil)/(total mass of the normal paraffins having not less than 20 carbon atoms in the feedstock)]×100    (3)

In the method for producing a lubricant base oil according to the present invention, preferably, the second step is performed so that the proportion of the normal paraffins having not less than 20 carbon atoms to be contained in the second produced oil is not more than 5% by mass. According to such a production method, a high quality lubricant base oil can be obtained with a higher yield.

Preferably, the second catalyst is a hydrogenation isomerization catalyst comprising a second carrier and an active metal carried on the second carrier, wherein the second carrier contains a one-dimensional 10-membered ring middle pore size zeolite and at least one porous inorganic oxide selected from alumina, silica, zirconia, titania, magnesia, and boria, and the active metal is platinum and/or palladium. According to such a catalyst, because hydrogenation isomerization progresses more efficiently, a high quality lubricant base oil can be obtained with a higher yield.

In the method for producing a lubricant base oil according to the present invention, preferably, the second step is performed so that the conversion rate of the normal paraffins represented by the following formula (4) is not less than 95%. According to such a production method, a high quality lubricant base oil can be obtained with a higher yield.

Conversion rate of the normal paraffins (%)=[1−(total mass of the normal paraffins having not less than 20 carbon atoms in the second produced oil)/ (total mass of the normal paraffins having not less than 20 carbon atoms in the first produced oil)]×100    (4)

In the method for producing a lubricant base oil according to the present invention, the second produced oil may be further subjected to hydrorefining. The second produced oil is subjected to hydrogenation isomerization while the hydrocracking reaction is suppressed. For this reason, the condition in the hydrorefining may be milder than that in the hydrorefining conventionally performed, and reduction in the yield caused by the hydrocracking reaction accompanying the hydrogenation treatment can be reduced.

In the method for producing a lubricant base oil according to the present invention, preferably, the first step and the second step are performed to obtain at least one lubricant base oil selected from the group consisting of a 70 Pale lubricant base oil whose boiling point is 340 to 410° C., viscosity index is not less than 105, pour point is not more than −25° C., and sulfur content is not more than 5 mass ppm; an SAE 10 lubricant base oil in which a boiling point is 390 to 470° C., a viscosity index is not less than 130, a pour point is not more than −12.5° C., and a sulfur content is not more than 5 mass ppm; an SAE 20 lubricant base oil in which a boiling point is 450 to 520° C., a viscosity index is not less than 130, a pour point is not more than −12.5° C., and a sulfur content is not more than 5 mass ppm; and an SAE 30 lubricant base in which a boiling point is 510 to 550° C., a viscosity index is not less than 130, a pour point is not more than −10° C., and a sulfur content is not more than 5 mass ppm. These lubricant base oils have sufficiently practical performance, and according to the production method of the present invention, even such a high quality lubricant base oil can be obtained with a high yield.

Advantageous Effects of Invention

According to the present invention, a method for producing a lubricant base oil in which a high quality lubricant base oil can be stably obtained from a feedstock containing normal paraffins with a high yield can be provided.

DESCRIPTION OF EMBODIMENTS

Hereinafter, a suitable embodiment according to the present invention will be described in detail.

(First Step)

In a first step in the method for producing a lubricant base oil according to the present embodiment, a feedstock containing normal paraffins having not less than 20 carbon atoms is contacted with a first catalyst in the presence of molecular hydrogen to obtain a first produced oil. The first catalyst comprises a first carrier in which the fraction of the amount of $NH_3$ to be desorbed at 300 to 800° C. based on the total amount of $NH_3$ to be desorbed is 80 to 90% in temperature-programmed desorption of $NH_3$ ($NH_3$-TPD), a first metal that is at least one selected from metals that belong to Group VI in the periodic table and is carried on the first carrier, and a second metal that is at least one selected from metals that belong to Group VIII to Group X in the periodic table and is carried on the first carrier. Moreover, the sum $C_1+C_2$ of a proportion $C_1$ of the first metal contained in the first catalyst in terms of an oxide (% by mass) and a proportion $C_2$ of the second metal contained in the first catalyst in terms of an oxide (% by mass) is 22 to 36% by mass, and the ratio $D_1/D_2$ between a content of the second metal $D_2$ (mol) and a content of the first metal $D_1$ (mol) in the first catalyst is 1.07 to 7.78.

In the first step, the sulfur content and nitrogen content in the feedstock are removed, and part of the normal paraffins having not less than 20 carbon atoms is isomerized to isoparaffins. In the first step, while hydrocracking of the normal paraffins is suppressed, hydrodesulfurization, hydrogenation denitrification, and hydrogenation isomerization can be progressed efficiently. Namely, according to the first step, a produced oil can be obtained in which the total content of the respective paraffins having not less than 20 carbon atoms is approximately the same as that in the feedstock, the contents of sulfur and nitrogen are sufficiently reduced, and most of the normal paraffins having not less than 20 carbon atoms is converted to the isomerized paraffins having not less than 20 carbon atoms; and a high quality lubricant base oil can be obtained from such a produced oil with a high yield. The term "high quality" means that environmental load is small because the content of sulfur is small, and high fuel efficiency can be achieved because of high performance at a low temperature.

The method for producing a lubricant base oil according to the present embodiment may further comprise steps such as hydrorefining and fractionation when necessary after the first step and a second step in which hydrogenation dewaxing is performed. In these steps, in the first produced oil, isomerization of the normal paraffins is sufficiently performed while the hydrocracking reaction is suppressed; for this reason, a sufficiently high quality lubricant base oil can be obtained on a condition milder than that in the conventional hydrogenation dewaxing, hydrorefining, fractionation, and the like. For this reason, a high quality lubricant base oil can be obtained with a high yield.

As the feedstock, at least one selected from the group consisting of slack waxes, dewaxed oils, paraffin waxes, microcrystalline waxes, petrolatum, Fischer-Tropsch waxes, light vacuum gas oils, hydrocracked vacuum gas oils, hydrocracked atmospheric residue, and hydrocracked vacuum residue can be suitably used. These feedstocks are available economically and stably.

The first catalyst used in the first step comprises a first carrier, a first metal that is at least one selected from metals that belong to Group VI in the periodic table and is carried on the first carrier, and a second metal that is at least one selected from metals that belong to Group VIII to Group X in the periodic table and is carried on the first carrier as active metals. The first catalyst may further comprise a metal other than the first metal and the second metal. Preferably, the first metal and the second metal are carried on the first carrier as an oxide.

As the first carrier, those preferably have solid acidity; preferable are those in which the fraction of the amount of $NH_3$ to be desorbed at 300 to 800° C. based on the total amount of $NH_3$ to be desorbed is 80 to 90% in temperature-programmed desorption of $NH_3$ ($NH_3$-TPD); and more preferable are those in which the fraction of the amount of $NH_3$ to be desorbed at 300 to 800° C. based on the total amount of $NH_3$ to be desorbed is 81% to 89.5% from the viewpoint of further improving the yield of the lubricant base oil.

Here, the "temperature-programmed desorption of $NH_3$" refers to a method described in following literatures (Sawa M., Niwa M., Murakami Y., Zeolites 1990, 10, 532, Karge H. G., Dondur V., J. Phys. Chem. 1990, 94, 765, and others), and is performed as follows. First, a carrier is pre-treated under a nitrogen stream at a temperature of not less than 400° C. for not less than 30 minutes to remove adsorbed molecules, and $NH_3$ is introduced into the catalyst to adsorb at 100° C. until $NH_3$ is saturated. Next, the temperature of the carrier is increased from 100 to 800° C. at a temperature ramping rate of not more than 10° C./min to desorb $NH_3$, and $NH_3$ separated by desorption is monitored at each predetermined temperature. Then, the fraction of the amount of $NH_3$ to be desorbed at 300° C. to 800° C. to the total amount of $NH_3$ to be desorbed (the amount of desorption at 100 to 800° C.) is determined.

Preferably, the first carrier is an amorphous carrier containing a complex oxide of alumina, silica, and zirconia. The catalyst containing such a carrier can further suppress the hydrocracking reaction accompanying hydrogenation isomerization, and has mechanical strength durable in commercial use.

In the first catalyst, $C_1+C_2$ is 22 to 36% by mass wherein the proportion of the contained first metal in terms of an oxide to the total amount of the first catalyst is $C_1$ (% by mass), and the proportion of the contained second metal in terms of an oxide to the total amount of the first catalyst is $C_2$ (% by mass); from the viewpoint of being capable of further suppressing the hydrocracking reaction, $C_1+C_2$ is preferably 24 to 33% by mass, and more preferably 25 to 30% by mass.

$C_1$ (% by mass) is a value determined by the following formula (1), and $C_2$ (% by mass) is a value determined by the following formula (2).

[Expression 1]

$$C_1 = \frac{\text{Mass of the first metal contained in the first catalyst in terms of an oxide}}{\text{Total mass of the first catalyst}} \times 100 \quad (1)$$

-continued $$C_2 = \frac{\text{Mass of the second metal contained in the first catalyst in terms of an oxide}}{\text{Total mass of the first catalyst}} \times 100 \quad (2)$$

Here, the "mass of the first metal contained in the first catalyst in terms of an oxide" indicates the mass of an oxide of the first metal with the same molar amount as the content of the first metal in the first catalyst (mol). Namely, if the content of the first metal is X mol, the "mass of the first metal contained in the first catalyst in terms of an oxide" indicates the mass equivalent to the mass of X mol of the oxide of the first metal. Moreover, the "mass of the second metal contained in the first catalyst in terms of an oxide" indicates the mass of an oxide of the second metal with the same molar amount as the content of the second metal in the first catalyst (mol).

Moreover, in the first catalyst, the ratio $D_1/D_2$ between a content of the second metal $D_2$ (mol) and the content of the second metal $D_1$ (mol) is 1.07 to 7.78; from the viewpoint of being capable of further suppressing the hydrocracking reaction, the ratio is preferably not less than 2.08 and more preferably not less than 2.25; moreover, the ratio is preferably not more than 6.75 and more preferably not more than 5.71.

Preferably, the first catalyst contains molybdenum and/or tungsten as the first metal, and cobalt and/or nickel as the second metal. According to such a catalyst, the hydrocracking reaction accompanying hydrogenation isomerization can be further suppressed.

In the first catalyst, the average pore radius of the catalyst determined by a BET method according to the nitrogen adsorption method is 40 to 200 Å, and more preferably 60 to 150 Å. At an average pore radius less than 40 Å, diffusion of reaction molecules (for example, the normal paraffins having not less than 20 carbon atoms, the sulfur content, the nitrogen content, and the like) within pores is not sufficiently performed, and the activity of the catalyst may be reduced. Moreover, at an average pore radius more than 200 Å, because the surface area of the catalyst is reduced, the activity of the catalyst is likely to be reduced.

In the first catalyst, the total volume of pores whose pore radius is less than 40 Å is preferably 0.1 to 5% of the total pore volume, and more preferably 0.1 to 3%. While easiness of diffusion of the reaction molecules in the pore whose pore radius is less than 40 Å is inferior to that in the pores whose pore radius is larger than that above, contribution to the desulphurization reaction cannot be neglected; if the total volume of pores is less than 0.1%, the effective surface area of the catalyst may be reduced to reduce the activity of the catalyst. On the other hand, if the total volume of pores is more than 5%, the activity of the catalyst may be conversely reduced by an influence of diffusion.

In the first catalyst, the total volume of pores whose pore radius is more than 200 Å is preferably 0.1 to 5% of the total pore volume, and more preferably 0.1 to 4%. It is thought that the pores whose pore radius is more than 200 Å are important pores that influence a degree at which the reaction molecules reach reaction active sites. If the total volume of the pores whose pore radius is more than 200 Å is less than 0.1%, diffusion of the reaction molecules is not sufficient, and the activity of the catalyst may be reduced; it is thought that if the total volume of the pores is more than 5%, the surface area of the catalyst itself is reduced to reduce the activity of the catalyst. According to such a catalyst, hydrodesulfurization, hydrogenation denitrification, and hydrogenation isomerization can be progressed more efficiently.

A method for carrying the first metal and the second metal on a carrier is not particularly limited, and a known method usually used when a catalyst is produced can be used. As such a method, a method for impregnating a solution containing salts of the first metal and the second metal to a carrier is preferably used. Moreover, an Equilibrium adsorption method, a Pore-filling method, an Incipient-wetness method, and the like are preferably used. For example, the Pore-filling method is a method in which the volume of the pore in the carrier is measured in advance, and the same volume of a metal salt solution is impregnated; the method for impregnation is not particularly limited, and impregnation can be performed by a suitable method depending on the amount of the metal to be carried and physical properties of the carrier.

Preferably, the first step is performed so that the content of the light paraffins having less than 20 carbon atoms is 0 to 10% by mass, the content of the isomerized paraffins having not less than 20 carbon atoms is not less than 70% by mass, the content of sulfur is not more than 10 mass ppm, and the content of nitrogen is not more than 3 mass ppm in the first produced oil. According to such a produced oil, the lubricant base oil can be obtained with a higher yield. Moreover, in the second step (hydrogenation dewaxing step) described later, if the sulfur content and nitrogen content in the first produced oil are sufficiently reduced, the activity of a second catalyst (hydrogenation dewaxing catalyst) is not impaired, and hydrogenation dewaxing progresses efficiently.

Moreover, in the first step, the conversion rate of the normal paraffins represented by the following formula (3) is preferably not less than 70%.

Conversion rate of the normal paraffins (%)=[1−(total mass of the normal paraffins having not less than 20 carbon atoms in the first produced oil)/(total mass of the normal paraffins having not less than 20 carbon atoms in the feedstock)]×100   (3)

The contact condition on the feedstock and the first catalyst in the first step is preferably the hydrogen partial pressure of 3 to 20 MPa, the average reaction temperature in the catalyst layer of 250 to 450° C., the LHSV of 0.5 to 5.0 h$^{-1}$, and the hydrogen/oil ratio of 1000 to 8000 scf/b, for example. According to such a condition, the suitable first produced oil above can be easily obtained. Moreover, the contact condition is particularly suitable in the case where the feedstock contains the normal paraffins having not less than 20 carbon atoms, not less than 500 mass ppm of the sulfur content, and not less than 10 mass ppm of the nitrogen content.

In the method for producing a lubricant base oil according to the present embodiment, steps such as hydrogenation dewaxing, solvent dewaxing, hydrorefining, and fractionation are further performed when necessary to obtain a lubricant base oil.

In the conventional method for producing a lubricant base oil, if refinement is performed to the extent that the normal paraffins are substantially not contained, a sufficient yield cannot be obtained due to loss of the paraffin component along with the refining operation. Contrary to this, in the production method according to the present invention, because isomerized paraffins can be efficiently obtained in the first step, loss of the paraffin component along with the refining operation is small, and a high quality lubricant base oil can be obtained with a high yield.

In the method for producing a lubricant base oil according to the present embodiment, from the viewpoint of obtaining a higher quality lubricant base oil, the first produced oil may be further subjected to a hydrogenation treatment. The first produced oil is subjected to hydrogenation isomerization while the hydrocracking reaction is suppressed. For this reason, the condition of the hydrogenation treatment may be milder than that in the hydrogenation treatment conventionally performed, and reduction in the yield caused by the hydrocracking reaction accompanying the hydrogenation treatment can be suppressed.

The hydrogenation treatment may be single stage or multi-stage. Examples of the hydrogenation treatment include hydrogenation dewaxing and hydrorefining; by combining these when necessary, a lubricant base oil having desired properties can be obtained.

Hereinafter, as an example of a suitable production method, a production method will be described in which the first produced oil is subjected to hydrogenation dewaxing (in the second step (hydrogenation dewaxing step)), and then subjected to hydrorefining (hydrorefining step), and the obtained base oil is fractionated to obtain a desired lubricant base oil (fractionation step).

(Second Step)

In the second step, the first produced oil and the second catalyst are contacted with each other in the presence of molecular hydrogen to obtain a second produced oil. The second produced oil obtained here is preferably subjected to hydrogenation dewaxing, namely, substantially does not contain the normal paraffins having not less than 20 carbon atoms (namely, the proportion of the normal paraffins having not less than 20 carbon atoms is not more than 5% by mass). The second step is the so-called hydrogenation dewaxing step.

As the second catalyst, a known hydrogenation isomerization catalyst can be used; for example, a catalyst comprising a carrier (hereinafter, referred to as a "second carrier.") and an active metal carried on the second carrier (hereinafter, referred to as a "third metal.") is preferable, and a bifunctional catalyst in which the second carrier has solid acidity is more preferable. Examples of the second carrier include a mixture of a one-dimensional 10-membered ring middle pore size zeolite and at least one porous inorganic oxide selected from alumina, silica, zirconia, titania, magnesia, and boria. Among these, as the one-dimensional 10-membered ring middle pore size zeolite, at least one zeolite selected from ZSM-22, ZSM-23, and ZSM-48 is preferable. Moreover, as the third metal carried on the second carrier, platinum and/or palladium is preferable.

In the second step, the conversion rate of the normal paraffins represented by the following formula (4) is preferably not less than 95%.

Conversion rate of the normal paraffins (%)=[1−(total mass of the normal paraffins having not less than 20 carbon atoms in the second produced oil)/ (total mass of the normal paraffins having not less than 20 carbon atoms in the first produced oil)]×100     (4)

In the second step, hydrogenation dewaxing is preferably performed at a hydrogen partial pressure of 0.5 to 20 MPa, an average reaction temperature in the catalyst layer of 250 to 400° C., an LHSV of 0.5 to 10.0 h$^{-1}$, and a hydrogen/oil ratio of 1000 to 10000 scf/b, for example.

(Hydrorefining (Hydrofinishing) Step)

In the hydrorefining step, the second produced oil and a third catalyst are contacted with each other in the presence of molecular hydrogen to obtain a third produced oil. In the hydrorefining step, olefin components and polycyclic aromatic compounds in the second produced oil can be hydrogenated to improve hue and/or oxidation stability.

As the third catalyst, known hydrorefining catalysts can be used; those preferably contain a carrier and a metal carried on the carrier. Examples of the carrier include alumina, silica, zirconia, titania, and boria. Moreover, examples of the metal carried on the carrier include nickel, molybdenum, cobalt, tungsten, palladium, and platinum. A plurality of metals may be carried on the carrier, and a combination of platinum-palladium, that of nickel-molybdenum, that of cobalt-molybdenum, that of nickel-tungsten, and the like are suitable.

In the hydrorefining step, hydrorefining is preferably performed at a hydrogen partial pressure of 1 to 20 MPa, a average reaction temperature in the catalyst layer of 200 to 350° C., an LHSV of 0.1 to 10.0 h$^{-1}$, and a hydrogen/oil ratio of 1000 to 10000 scf/b, for example.

(Fractionation Step)

In the fractionation step, a lubricant oil fraction is distilled and separated from the third produced oil. At this time, a fuel oil fraction as a light content may be obtained.

In the fractionation step, the third produced oil can be distilled under reduced pressure to suitably obtain lubricant base oils referred to as 70 Pale, SAE 10, SAE 20, and SAE 30. More specifically, in the fractionation step, as the lubricant base oils corresponding to 70 Pale, SAE 10, SAE 20, and SAE 30, the lubricant base oils each having properties below can be obtained. An NOACK evaporation loss indicates the amount of evaporation loss measured according to ASTM D5800.

70 Pale: the boiling point is 340 to 410° C., the kinematic viscosity at 100° C. is 2.2 to 3.8 mm$^2$/s, the viscosity index is not less than 105, the pour point is not more than −25° C., and the sulfur content is not more than 5 mass ppm.

SAE 10: the boiling point is 390 to 470° C., the kinematic viscosity at 100° C. is 3.5 to 5.6 mm$^2$/s, the viscosity index is not less than 130, the CCS viscosity at −30° C. is not more than 2800, the NOACK evaporation loss is not more than 16% by mass, the pour point is not more than −12.5° C., and the sulfur content is not more than 5 mass ppm.

SAE 20: the boiling point is 450 to 520° C., the kinematic viscosity at 100° C. is 5.6 to 9.3 mm$^2$/s, the viscosity index is not less than 130, the pour point is not more than −12.5° C., and the sulfur content is not more than 5 mass ppm.

SAE 30: the boiling point is 510 to 550° C., the kinematic viscosity at 100° C. is 9.3 to 12.5 mm$^2$/s, the viscosity index is not less than 130, the pour point is not more than −10° C., and the sulfur content is not more than 5 mass ppm.

The lubricant base oil obtained according to the method for producing a lubricant base oil according to the present embodiment itself has high thermal stability and oxidation stability; in the case where additives are further blended with the lubricant base oil, while the additives are dissolved and kept in the lubricant base oil sufficiently stably, the functions of the additives can be demonstrated at a higher level. For this reason, in a lubricant oil composition in which an antioxidant is blended with the lubricant base oil, thermal stability and oxidation stability at a high level can be achieved. For example, in the case where the obtained lubricant base oil corresponds to 70 Pale, the RBOT life can be not less than 290 min. Moreover, in the case where the obtained lubricant base oil corresponds to SAE 10, the RBOT life can be not less than 350 min. Moreover, in the case where the obtained lubricant base oil corresponds to SAE 20, the RBOT life can be not less than 400 min. The RBOT life in the present invention means a RBOT value measured according to JIS K 2514 in a composition in which 0.2% by mass of a phenol antioxidant (2,6-di-tert-butyl-p-cresol; DBPC) is added to the lubricant base oil.

Further, according to the lubricant base oil obtained by the production method according to the present embodiment, because the viscosity-temperature properties and friction properties of the lubricant base oil itself are high, improvement in a friction reduction effect and improvement in energy-saving properties can be achieved. Further, in the lubricant base oil, the additives are highly effective; for this reason, in the case where a friction reducing agent is blended with the lubricant base oil, improvement in the friction reduction effect and improvement in the energy-saving properties can be achieved.

The lubricant base oil obtained by the production method according to the present embodiment has high properties as described above, and can be suitably used as a base oil for various lubricant oils. Examples of application of the lubricant base oil specifically include a lubricant oil used for internal combustion engines (lubricant oil for internal combustion engines) such as gasoline engines for automobiles, gasoline engines for two-wheeled vehicles, diesel engines, gas engines, engines for gas heat pumps, engines for ships, and generator engines, a lubricant oil used for driving and transmitting apparatuses (oil for driving and transmitting apparatuses) such as automatic transmissions, manual transmissions, continuously variable transmissions, and final drives, hydraulic oils used for hydraulic apparatuses such as buffers and construction machines, compressor oils, turbine oils, gear oils, refrigeration oils, and oil agents for processing metals; if the lubricant base oil according to the present invention is used in these applications, improvement in properties such as the viscosity-temperature properties, thermal stability, oxidation stability, energy-saving properties, fuel efficiency, a longer life of the lubricant oil, and reduction in the substances of concern in the respective lubricant oils can be achieved at a high level.

EXAMPLES

Examples 1 to 12

Comparative Examples 1 to 9

An amorphous alumina silica zirconia complex oxide according to Example 1 was prepared according to the following method. First, Solution A, Solution B, and Solution C are prepared. Solution A: a solution in which 20 g of an aluminum sulfate 16-hydrate reagent is dissolved in 90 ml of ion exchange water. Solution B: a solution in which 11.4 g of liquid glass No. 3 is dissolved in 50 ml of ion exchange water. Solution C: a solution in which 2.3 g of a zirconium sulfate tetrahydrate reagent is dissolved in 50 ml of ion exchange water.

Next, Solution B was gelated at pH 14, and Solution C was added to the slurry aged at pH 7 for 2 hours; further, the slurry was adjusted at pH 7 to produce silica zirconia complex hydroxide. Solution A was added to silica zirconia complex hydroxide to adjust the slurry at pH 7 to produce silica zirconia alumina complex hydroxide. The obtained slurry was filtered, washed, and heated and condensed to adjust moisture; then, the slurry was extrusion molded, dried, and burned to obtain an extruded product (carrier) with a diameter of approximately 1.5 mm and a length of approximately 10 mm. About the obtained carrier, temperature-programmed desorption of $NH_3$ was made. The fraction of the amount of $NH_3$ to be desorbed at 300 to 800° C. based on the total amount of $NH_3$ to be desorbed is shown in Table 1. Metals were carried on the carrier by the Pore-filling method so that the contents of the metals were as shown in Table 1, and sulfurized to obtain a first catalyst.

In Examples other than Example 1, a carrier was prepared by adjusting the concentration of Solution A, Solution B, and Solution C so that the composition of the carrier shown in Table 1 was satisfied, and metals were carried on the obtained carrier by the Pore-filling method so that the contents of the metals were as shown in Table 1, and sulfurized to obtain a first catalyst.

TABLE 1

| | Composition of first catalyst | | | | | | | | | Physical properties of first catalyst (nitrogen adsorption method) | | |
|---|---|---|---|---|---|---|---|---|---|---|---|---|---|
| | Carrier composition (% by mass) | | | Amount of $NH_3$ to be desorbed | Metal composition | | | | | $P_2O_5$ (contained proportion to whole amount of first catalyst | Average pore radius | Pore radius of not more than 40 Å (vol %) Pore volume | Pore radius of not less than 200 Å (vol %) Pore volume |
| | | | | | a Proportion of contained first metal in terms of oxide ($C_1$) (% by mass) | | b Proportion of contained second metal in terms of oxide ($C_2$) (% by mass) | | Molar ratio | | | | | |
| | $Al_2O_3$ | $SiO_2$ | $ZrO_2$ | (%) | $MoO_3$ | $WO_3$ | NiO | CoO | $D_1/D_2$ | (% by mass)) | (Å) | (vol %) | (vol %) |
| Example 1 | 60.4 | 31.4 | 8.2 | 85.2 | 24.2 | 0.0 | 3.8 | 0.0 | 3.3 | 3.1 | 102 | 1.1 | 3.1 |
| Example 2 | 60.4 | 31.4 | 8.2 | 85.2 | 0.0 | 22.9 | 4.2 | 0.0 | 1.8 | 3.0 | 105 | 1.2 | 4.0 |
| Example 3 | 60.4 | 31.4 | 8.2 | 85.2 | 26.0 | 0.0 | 0.0 | 3.0 | 4.5 | 3.1 | 104 | 1.0 | 2.3 |
| Example 4 | 30.0 | 55.8 | 14.2 | 80.4 | 24.4 | 0.0 | 3.7 | 0.0 | 3.4 | 2.9 | 99 | 1.5 | 3.4 |
| Example 5 | 59.5 | 32.1 | 8.4 | 83.9 | 24.8 | 0.0 | 3.5 | 0.0 | 3.7 | 2.9 | 108 | 1.1 | 3.6 |
| Example 6 | 70.5 | 24.1 | 5.4 | 88.7 | 23.9 | 0.0 | 4.0 | 0.0 | 3.1 | 3.0 | 100 | 1.3 | 4.1 |
| Example 7 | 30.3 | 55.4 | 14.3 | 81.8 | 24.7 | 0.0 | 3.8 | 0.0 | 3.4 | 3.1 | 98 | 1.2 | 4.0 |
| Example 8 | 69.7 | 24.0 | 6.3 | 88.7 | 22.1 | 0.0 | 3.8 | 0.0 | 3 | 3.0 | 107 | 1.0 | 3.9 |
| Example 9 | 30.0 | 49.0 | 21.0 | 83.5 | 24.2 | 0.0 | 3.8 | 0.0 | 3.3 | 3.0 | 97 | 0.8 | 4.0 |
| Example 10 | 50.2 | 39.4 | 10.4 | 83.3 | 22.0 | 0.0 | 3.6 | 0.0 | 3.2 | 2.9 | 102 | 0.9 | 3.5 |
| Example 11 | 60.0 | 28.0 | 12.0 | 86.6 | 23.8 | 0.0 | 3.9 | 0.0 | 3.2 | 2.9 | 103 | 1.2 | 4.6 |
| Example 12 | 70.0 | 21.0 | 9.0 | 89.2 | 25.0 | 0.0 | 3.7 | 0.0 | 3.5 | 3.0 | 106 | 1.3 | 4.2 |

TABLE 1-continued

| | Carrier composition (% by mass) | | | Amount of NH₃ to be desorbed (%) | Composition of first catalyst | | | | | P₂O₅ (contained proportion to whole amount of first catalyst (% by mass)) | Physical properties of first catalyst (nitrogen adsorption method) | | |
|---|---|---|---|---|---|---|---|---|---|---|---|---|---|
| | | | | | Metal composition | | | | | | | Pore radius of not more than 40 Å (vol %) Pore volume | Pore radius of not less than 200 Å (vol %) Pore volume |
| | | | | | a Proportion of contained first metal in terms of oxide (C₁) (% by mass) | | b Proportion of contained second metal in terms of oxide (C₂) (% by mass) | | Molar ratio | | Average pore radius | | |
| | Al₂O₃ | SiO₂ | ZrO₂ | (%) | MoO₃ | WO₃ | NiO | CoO | D₁/D₂ | (% by mass) | (Å) | (vol %) | (vol %) |
| Comparative Example 1 | 69.8 | 30.2 | 0.0 | 92.1 | 22.0 | 0.0 | 3.0 | 0.0 | 3.8 | 3.1 | 108 | 1.2 | 3.9 |
| Comparative Example 2 | 0.0 | 70.9 | 29.1 | 75.6 | 21.9 | 0.0 | 3.0 | 0.0 | 3.8 | 2.9 | 102 | 1.5 | 3.3 |
| Comparative Example 3 | 60.4 | 31.4 | 8.2 | 85.2 | 33.5 | 0.0 | 3.0 | 0.0 | 5.8 | 2.9 | 102 | 1.2 | 3.5 |
| Comparative Example 4 | 60.4 | 31.4 | 8.2 | 85.2 | 27.2 | 0.0 | 10.6 | 0.0 | 1.3 | 3.0 | 102 | 1.5 | 3.6 |
| Comparative Example 5 | 60.4 | 31.4 | 8.2 | 85.2 | 34.8 | 0.0 | 10.2 | 0.0 | 1.8 | 3.0 | 102 | 1.5 | 3.5 |
| Comparative Example 6 | 20.0 | 72.0 | 8.0 | 77.8 | 24.1 | 0.0 | 3.7 | 0.0 | 3.4 | 3.1 | 98 | 1.3 | 4.5 |
| Comparative Example 7 | 20.0 | 56.0 | 24.0 | 78.5 | 23.8 | 0.0 | 4.2 | 0.0 | 2.9 | 2.9 | 98 | 1.4 | 4.3 |
| Comparative Example 8 | 90.0 | 7.0 | 3.0 | 79.2 | 24.2 | 0.0 | 3.9 | 0.0 | 3.2 | 3.1 | 110 | 1.3 | 4.6 |
| Comparative Example 9 | 60.4 | 31.4 | 8.2 | 85.2 | 26.6 | 0.0 | 3.0 | 0.0 | 4.6 | 3.0 | 109 | 1.5 | 4.3 |

Next, the catalyst shown in Table 1 above and the slack wax having properties shown in Table 2 below were contacted with each other under the condition shown in Table 3 to obtain a produced oil having properties shown in Table 3 (first produced oil). In the table, the cracking rate indicates a value determined from a yield of the component having not more than 19 carbon atoms in the produced oil determined by a gas chromatography analysis, and the isomerization rate indicates a value determined from the proportion of the isomer in the component having not less than 20 carbon atoms determined by a gas chromatography analysis. Moreover, the sulfur content indicates a value measured according to JIS K2541 "Crude Oil and Petroleum Products-Sulfur Content Test Method," and the nitrogen content indicates a value measured according to JIS K2609 "Crude Oil and Petroleum Product-Nitrogen Content Test Method."

TABLE 2

| | | Slack wax | Method for analysis |
|---|---|---|---|
| Density (@15° C., g/cm³) | | 0.8199 | JIS K2249 |
| Kinematic viscosity (@40° C., mm²/s) | | 234 | JIS K2283 |
| Normal paraffins having not less than 20 carbon atoms (% by mass) | | 99.1 | Gas chromatography analysis |
| Sulfur content (mass ppm) | | 1600 | JIS K2541 |
| Nitrogen content (mass ppm) | | 25 | JIS K2609 |
| Distillation properties (° C.) | Initial boiling point | 359.4 | JIS K2254 gas chromatograph analysis |
| | Distillation temperature at 5% evaporated | 386.2 | |
| | Distillation temperature at 10% evaporated | 395.0 | |
| | Distillation temperature at 20% evaporated | 409.1 | |
| | Distillation temperature at 30% evaporated | 416.9 | |
| | Distillation temperature at 40% evaporated | 425.3 | |
| | Distillation temperature at 50% evaporated | 432.2 | |
| | Distillation temperature at 60% evaporated | 438.6 | |
| | Distillation temperature at 70% evaporated | 445.2 | |
| | Distillation temperature at 80% evaporated | 452.6 | |
| | Distillation temperature at 90% evaporated | 461.2 | |
| | Distillation temperature at 95% evaporated | 468.6 | |
| | End point | 489.0 | |

TABLE 3

| | Reaction condition | | | | Properties of first produced oil | | | |
|---|---|---|---|---|---|---|---|---|
| | Reaction temperature (° C.) | LHSV (h⁻¹) | Hydrogen partial pressure (MPa) | Hydrogen/ oil ratio (scf/b) | Cracking rate (% by mass) | Isomerization rate (% by mass) | Sulfur content (mass ppm) | Nitrogen content (mass ppm) |
| Example 1 | 365 | 1.25 | 5.4 | 3000 | 5.3 | 76 | 1.4 | Less than 1 |
| Example 2 | 363 | 1.25 | 5.4 | 3000 | 6.1 | 75 | 1.1 | Less than 1 |
| Example 3 | 362 | 1.25 | 5.4 | 3000 | 5.5 | 71 | 2.0 | Less than 1 |
| Example 4 | 364 | 1.25 | 5.4 | 3000 | 5.2 | 70 | 1.1 | Less than 1 |
| Example 5 | 362 | 1.25 | 5.4 | 3000 | 5.3 | 76 | 1.0 | Less than 1 |
| Example 6 | 360 | 1.25 | 5.4 | 3000 | 5.6 | 74 | 1.1 | Less than 1 |
| Example 7 | 365 | 1.25 | 5.4 | 3000 | 6.8 | 70 | 1.3 | Less than 1 |
| Example 8 | 361 | 1.25 | 5.4 | 3000 | 7.8 | 76 | 1.3 | Less than 1 |
| Example 9 | 368 | 1.25 | 5.4 | 3000 | 8.9 | 72 | 1.1 | Less than 1 |
| Example 10 | 365 | 1.25 | 5.4 | 3000 | 5.6 | 72 | 1.0 | Less than 1 |
| Example 11 | 365 | 1.25 | 5.4 | 3000 | 5.3 | 70 | 1.2 | Less than 1 |
| Example 12 | 361 | 1.25 | 5.4 | 3000 | 5.2 | 72 | 1.0 | Less than 1 |
| Comparative Example 1 | 359 | 1.25 | 5.4 | 3000 | 13.4 | 69 | 1.1 | Less than 1 |
| Comparative Example 2 | 367 | 1.25 | 5.4 | 3000 | 5.1 | 47 | 2.3 | Less than 1 |
| Comparative Example 3 | 371 | 1.25 | 5.4 | 3000 | 10.1 | 59 | 1.9 | Less than 1 |
| Comparative Example 4 | 372 | 1.25 | 5.4 | 3000 | 12.2 | 59 | 3.5 | Less than 1 |
| Comparative Example 5 | 370 | 1.25 | 5.4 | 3000 | 14.1 | 48 | 3.1 | Less than 1 |
| Comparative Example 6 | 376 | 1.25 | 5.4 | 3000 | 15.0 | 55 | 4.0 | Less than 1 |
| Comparative Example 7 | 373 | 1.25 | 5.4 | 3000 | 13.6 | 58 | 2.8 | Less than 1 |
| Comparative Example 8 | 374 | 1.25 | 5.4 | 3000 | 15.0 | 52 | 2.4 | Less than 1 |
| Comparative Example 9 | 365 | 1.25 | 5.4 | 3000 | 5.2 | 76 | 1.4 | Less than 1 |

Next, each of the first produced oils obtained in Examples 1 to and Comparative Examples 1 to 8 was subjected to the hydrogenation treatment (hydrogenation dewaxing step) on the condition shown in Table 4 below to obtain a second produced oil. In the table, the content of the normal paraffins having not less than 20 carbon atoms indicates a value determined by a gas chromatography analysis. In the first produced oil obtained in Comparative Example 9, a methyl ethyl ketone/toluene mixed solvent (mixing proportion of 50 volume %/50 volume %) was added by the amount 3.5 times the amount of the first produced oil, and solvent dewaxing by filtration at −32° C. was performed; the produced oil after the solvent dewaxing was used as the second produced oil.

TABLE 4

| | Reaction condition | | | | | Second produced oil |
|---|---|---|---|---|---|---|
| | Second catalyst (active metal/ carrier) | Reaction temperature (° C.) | LHSV (h⁻¹) | Hydrogen partial pressure (MPa) | Hydrogen/ oil ratio (scf/b) | Content of normal paraffins having not less than 20 carbon atoms (% by mass) |
| Example 1 | Pt/ZSM-22 | 315 | 1.25 | 5.4 | 3000 | 0.3 |
| Example 2 | Pt/ZSM-22 | 315 | 1.25 | 5.4 | 3000 | 0.5 |
| Example 3 | Pt/ZSM-22 | 318 | 1.25 | 5.4 | 3000 | 0.5 |
| Example 4 | Pt/ZSM-22 | 319 | 1.25 | 5.4 | 3000 | 0.9 |
| Example 5 | Pt/ZSM-22 | 315 | 1.25 | 5.4 | 3000 | 0.4 |
| Example 6 | Pt/ZSM-22 | 316 | 1.25 | 5.4 | 3000 | 0.5 |
| Example 7 | Pt/ZSM-22 | 319 | 1.25 | 5.4 | 3000 | 0.7 |
| Example 8 | Pt/ZSM-22 | 315 | 1.25 | 5.4 | 3000 | 0.6 |
| Example 9 | Pt/ZSM-22 | 317 | 1.25 | 5.4 | 3000 | 0.4 |
| Example 10 | Pt/ZSM-22 | 317 | 1.25 | 5.4 | 3000 | 0.5 |
| Example 11 | Pt/ZSM-22 | 319 | 1.25 | 5.4 | 3000 | 0.3 |
| Example 12 | Pt/ZSM-22 | 317 | 1.25 | 5.4 | 3000 | 0.2 |
| Comparative Example 1 | Pt/ZSM-22 | 320 | 1.25 | 5.4 | 3000 | 0.3 |
| Comparative Example 2 | Pt/ZSM-22 | 330 | 1.25 | 5.4 | 3000 | 0.1 |
| Comparative Example 3 | Pt/ZSM-22 | 328 | 1.25 | 5.4 | 3000 | 0.3 |
| Comparative Example 4 | Pt/ZSM-22 | 328 | 1.25 | 5.4 | 3000 | 0.5 |

TABLE 4-continued

| | Reaction condition | | | | | Second produced oil |
|---|---|---|---|---|---|---|
| | Second catalyst (active metal/carrier) | Reaction temperature (° C.) | LHSV (h⁻¹) | Hydrogen partial pressure (MPa) | Hydrogen/oil ratio (scf/b) | Content of normal paraffins having not less than 20 carbon atoms (% by mass) |
| Comparative Example 5 | Pt/ZSM-22 | 331 | 1.25 | 5.4 | 3000 | 0.9 |
| Comparative Example 6 | Pt/ZSM-22 | 327 | 1.25 | 5.4 | 3000 | 0.8 |
| Comparative Example 7 | Pt/ZSM-22 | 326 | 1.25 | 5.4 | 3000 | 0.7 |
| Comparative Example 8 | Pt/ZSM-22 | 328 | 1.25 | 5.4 | 3000 | 0.6 |
| Comparative Example 9 | — | — | — | — | — | — |

Further, the second produced oil was subjected to the hydrogenation treatment (hydrorefining step) in the presence of the catalyst, in which the active metal was platinum and the carrier was alumina, on the condition of the reaction temperature of 220° C., the LHSV of 2 h⁻¹, the hydrogen partial pressure of 5 MPa, and the hydrogen/oil ratio of 3000 scf/b to obtain a third produced oil. The obtained third produced oil was fractionated by distillation under reduced pressure to obtain a 70 Pale base oil that is a fraction at 340 to 410° C. in terms of normal pressure, an SAE 10 base oil that is a fraction at 390 to 470° C. in terms of normal pressure, an SAE 20 base oil that is a fraction at 450 to 520° C. in terms of normal pressure, and an SAE 30 base oil that is a fraction at 510 to 550° C. in terms of normal pressure. The yields and properties of the obtained base oils were as shown in Table 5. The kinematic viscosity (100° C.) and the viscosity index (VI) were measured according to JIS K2283 "Crude Oil and Petroleum Products-Kinematic Viscosity Test Method and Viscosity Index Calculation Method," and the pour point was measured according to JIS K2269 "Pour Point of Crude Oil and Petroleum Products and Cloud Point of Petroleum Products Test Method." In each of Examples, a high quality lubricant base oil could be obtained with a high yield.

TABLE 5

| | 70 Pale lubricant base oil | | | | SAE 10 lubricant base oil | | | | SAE 20 lubricant base oil | | | | SAE 30 lubricant base oil | | | |
|---|---|---|---|---|---|---|---|---|---|---|---|---|---|---|---|---|
| | Yield (% by mass) | Kinematic viscosity @100° C. (mm²/s) | Pour point (° C.) | Viscosity index (VI) | Yield (% by mass) | Kinematic viscosity @100° C. (mm²/s) | Pour point (° C.) | Viscosity index (VI) | Yield (% by mass) | Kinematic viscosity @100° C. (mm²/s) | Pour point (° C.) | Viscosity index (VI) | Yield (% by mass) | Kinematic viscosity @100° C. (mm²/s) | Pour point (° C.) | Viscosity index (VI) |
| Example 1 | 16.6 | 2.713 | −30.0 | 108 | 52.5 | 3.986 | −25.0 | 145 | 11.9 | 6.233 | −15.0 | 151 | 6.9 | 10.25 | −12.5 | 158 |
| Example 2 | 15.4 | 2.822 | −30.0 | 108 | 52.0 | 3.949 | −25.0 | 144 | 10.8 | 6.254 | −15.0 | 151 | 6.3 | 10.33 | −10.0 | 157 |
| Example 3 | 15.5 | 2.706 | −27.5 | 108 | 51.4 | 4.001 | −27.5 | 144 | 10.6 | 6.156 | −15.0 | 150 | 6.2 | 10.21 | −10.0 | 157 |
| Example 4 | 15.6 | 2.811 | −30.0 | 108 | 50.6 | 3.996 | −22.5 | 143 | 10.4 | 6.256 | −15.0 | 151 | 6.1 | 10.30 | −12.5 | 158 |
| Example 5 | 16.3 | 2.813 | −27.5 | 108 | 52.5 | 3.99 | −20.0 | 145 | 10.8 | 6.278 | −15.0 | 151 | 6.3 | 10.21 | −12.5 | 157 |
| Example 6 | 15.4 | 2.788 | −27.5 | 108 | 52.0 | 3.978 | −22.5 | 144 | 10.6 | 6.292 | −15.0 | 150 | 6.3 | 10.11 | −12.5 | 157 |
| Example 7 | 15.3 | 2.798 | −30.0 | 108 | 50.1 | 3.982 | −27.5 | 143 | 10.5 | 6.182 | −15.0 | 150 | 6.4 | 10.14 | −12.5 | 158 |
| Example 8 | 15.7 | 2.746 | −30.0 | 108 | 52.4 | 3.969 | −25.0 | 145 | 10.4 | 6.154 | −15.0 | 150 | 6.8 | 10.13 | −12.5 | 159 |
| Example 9 | 15.6 | 2.746 | −27.5 | 108 | 48.9 | 3.959 | −25.0 | 143 | 10.8 | 6.224 | −15.0 | 151 | 6.9 | 10.21 | −10.0 | 157 |
| Example 10 | 15.8 | 2.768 | −30.0 | 108 | 52.5 | 3.999 | −25.0 | 143 | 10.8 | 6.291 | −15.0 | 151 | 6.1 | 10.51 | −12.5 | 158 |
| Example 11 | 16.1 | 2.784 | −27.5 | 108 | 52.0 | 4.002 | −25.0 | 142 | 10.8 | 6.199 | −15.0 | 151 | 6.9 | 10.21 | −12.5 | 158 |
| Example 12 | 16.1 | 2.715 | −27.5 | 108 | 52.4 | 3.899 | −25.0 | 144 | 10.8 | 6.145 | −15.0 | 151 | 6.8 | 10.34 | −12.5 | 157 |
| Comparative Example 1 | 14.5 | 2.874 | −27.5 | 108 | 43.2 | 3.979 | −27.5 | 141 | 10.2 | 6.162 | −15.0 | 152 | 5.9 | 10.09 | −12.5 | 159 |
| Comparative Example 2 | 14.6 | 2.789 | −27.5 | 108 | 41.9 | 4.011 | −22.5 | 143 | 9.8 | 6.192 | −15.0 | 151 | 5.7 | 10.17 | −12.5 | 157 |
| Comparative Example 3 | 14.6 | 2.714 | −27.5 | 108 | 46.3 | 3.979 | −25.0 | 142 | 10.1 | 6.182 | −15.0 | 151 | 5.8 | 11.08 | −12.5 | 158 |
| Comparative Example 4 | 14.8 | 2.781 | −27.5 | 107 | 43.8 | 3.943 | −27.5 | 142 | 9.9 | 6.175 | −15.0 | 150 | 5.6 | 10.41 | −10.0 | 157 |
| Comparative Example 5 | 14.9 | 2.801 | −27.5 | 107 | 41.6 | 3.975 | −27.5 | 141 | 10.5 | 6.197 | −15.0 | 150 | 5.4 | 10.54 | −12.5 | 159 |
| Comparative Example 6 | 14.7 | 2.811 | −27.5 | 107 | 46.2 | 3.999 | −30.0 | 140 | 10.3 | 6.182 | −15.0 | 150 | 5.1 | 10.61 | −10.0 | 157 |
| Comparative Example 7 | 14.8 | 2.798 | −27.5 | 107 | 47.3 | 3.979 | −17.5 | 145 | 10.4 | 6.143 | −15.0 | 150 | 5.2 | 10.31 | −10.0 | 158 |
| Comparative Example 8 | 14.5 | 2.808 | −27.5 | 107 | 46.1 | 3.981 | −22.5 | 144 | 9.8 | 6.152 | −15.0 | 150 | 5.3 | 10.28 | −12.5 | 158 |
| Comparative Example 9 | 14.1 | 2.814 | −27.5 | 106 | 42.0 | 3.899 | −27.5 | 139 | 8.5 | 6.184 | −15.0 | 150 | 5.1 | 10.19 | −10.0 | 156 |

The invention claimed is:

1. A method for producing a lubricant base oil, comprising:
   a first step of contacting a feedstock containing normal paraffins having not less than 20 carbon atoms with a first catalyst in the presence of molecular hydrogen to obtain a first produced oil, and
   a second step of contacting the first produced oil with a second catalyst in the presence of molecular hydrogen to obtain a second produced oil, wherein
   the first catalyst comprises a first carrier in which a fraction of an amount of $NH_3$ to be desorbed at 300 to 800° C. based on a total amount of $NH_3$ to be desorbed is 80 to 90% in temperature-programmed desorption of $NH_3$, a first metal that is at least one selected from metals that belong to Group VI in the periodic table and is carried on the first carrier, and a second metal that is at least one selected from metals that belong to Group VIII to Group X in the periodic table and is carried on the first carrier,
   a sum $C_1+C_2$ of a proportion $C_1$ (% by mass) of the first metal contained in the first catalyst in terms of an oxide and a proportion $C_2$ of the second metal contained in the first catalyst in terms of an oxide (% by mass) is 22 to 36% by mass, and
   a ratio $D_1/D_2$ between a content of the second metal $D_2$ (mol) and a content of the first metal $D_1$ (mol) in the first catalyst is 1.07 to 7.78.

2. The method for producing a lubricant base oil according to claim 1, wherein in the first produced oil, a content of light paraffins having less than 20 carbon atoms to be contained is 0 to 10% by mass, a content of isomerized paraffins having not less than 20 carbons atoms to be contained is not less than 70% by mass, a content of a sulfur to be contained is not more than 10 mass ppm, and a content of a nitrogen to be contained is not more than 3 mass ppm.

3. The method for producing a lubricant base oil according to claim 1, wherein the first catalyst contains molybdenum and/or tungsten as the first metal.

4. The method for producing a lubricant base oil according to claim 1, wherein the first catalyst contains cobalt and/or nickel as the second metal.

5. The method for producing a lubricant base oil according to claim 1, wherein the first catalyst further contains phosphorus carried on the first carrier, and a content of the phosphorus contained in the first catalyst in terms of an oxide is 0.1 to 8% by mass.

6. The method for producing a lubricant base oil according to claim 1, wherein in the first catalyst, an average pore radius is 40 to 200 Å; and a total volume of pores whose pore radius is less than 40 Å is 0.1 to 5% of a total pore volume, and a total volume of pores whose pore radius is more than 200 Å is 0.1 to 5% of the total pore volume.

7. The method for producing a lubricant base oil according to claim 1, wherein the first carrier is a carrier containing a complex oxide of alumina, silica, and zirconia.

8. The method for producing a lubricant base oil according to claim 1, wherein in the first step, part of the normal paraffins having not less than 20 carbon atoms is isomerized to isoparaffins.

9. The method for producing a lubricant base oil according to claim 1, wherein the feedstock is at least one selected from the group consisting of slack waxes, dewaxed oils, paraffin waxes, microcrystalline waxes, petrolatum, Fischer-Tropsch waxes, vacuum gas oils, hydrocracked vacuum gas oils, hydrocracked atmospheric residue, and hydrocracked vacuum residue.

10. The method for producing a lubricant base oil according to claim 1, wherein in the first step, a conversion rate of the normal paraffins represented by a following formula (3) is not less than 70%:

conversion rate of the normal paraffins (%)=[1−(total mass of the normal paraffins having not less than 20 carbon atoms in the first produced oil)/(the total mass of the normal paraffins having not less than 20 carbon atoms in the feedstock)]×100   (3).

11. The method for producing a lubricant base oil according to claim 1, wherein in the second produced oil, a proportion of the normal paraffins having not less than 20 carbon atoms is not more than 5% by mass.

12. The method for producing a lubricant base oil according to claim 1, wherein
   the second catalyst is a hydrogenation isomerization catalyst comprising a second carrier and an active metal carried on the second carrier,
   the second carrier contains a one-dimensional 10-membered ring middle pore size zeolite, and at least one porous inorganic oxide selected from alumina, silica, zirconia, titania, magnesia, and boria, and
   the active metal is platinum and/or palladium.

13. The method for producing a lubricant base oil according to claim 1, wherein in the second step, a conversion rate of the normal paraffins represented by a following formula (4) is not less than 95%:

conversion rate of the normal paraffins (%)=[1−(total mass of the normal paraffins having not less than 20 carbon atoms in the second produced oil)/ (total mass of the normal paraffins having not less than 20 carbon atoms in the first produced oil)]×100   (4).

14. The method for producing a lubricant base oil according to claim 1, wherein the second produced oil is further subjected to hydrorefining.

15. The method for producing a lubricant base oil according to claim 1, wherein
   the first step and the second step are performed to obtain at least one lubricant base oil selected from the group consisting of:
   a 70 Pale lubricant base oil in which a boiling point is 340 to 410° C., a viscosity index is not less than 105, a pour point is not more than −25° C., a sulfur content is not more than 5 mass ppm,
   an SAE 10 lubricant base oil in which a boiling point is 390 to 470° C., a viscosity index is not less than 130, a pour point is not more than −12.5° C., and a sulfur content is not more than 5 mass ppm,
   an SAE 20 lubricant base oil in which a boiling point is 450 to 520° C., a viscosity index is not less than 130, a pour point is not more than −12.5° C., and a sulfur content is not more than 5 mass ppm, and
   an SAE 30 lubricant base oil in which a boiling point is 510 to 550° C., a viscosity index is not less than 130, a pour point is not more than −10° C., and a sulfur content is not more than 5 mass ppm.

* * * * *